(12) United States Patent
Wadhwa (10) Patent No.: US 9,432,354 B2
(45) Date of Patent: Aug. 30, 2016

(54) ROLE-BASED ACCESS TOOL

(71) Applicant: Bank of America Corporation, Charlotte, NC (US)

(72) Inventor: Vishal Wadhwa, Kukatpally (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 14/588,423

(22) Filed: Jan. 1, 2015

(65) Prior Publication Data

US 2016/0197910 A1 Jul. 7, 2016

(51) Int. Cl.
*H04L 29/06* (2006.01)
*G06F 21/41* (2013.01)
*H04W 12/06* (2009.01)

(52) U.S. Cl.
CPC ........... *H04L 63/0815* (2013.01); *G06F 21/41* (2013.01); *H04L 63/102* (2013.01); *H04W 12/06* (2013.01)

(58) Field of Classification Search
CPC . H04L 63/0815; H04L 63/102; G06F 21/41; H04W 12/06
See application file for complete search history.

(56) References Cited

U.S. PATENT DOCUMENTS

| | | | | |
|---|---|---|---|---|
| 6,182,142 B1* | 1/2001 | Win | ...................... | G06F 21/604 709/219 |
| 6,460,141 B1* | 10/2002 | Olden | ................... | G06F 21/604 726/12 |
| 7,003,560 B1* | 2/2006 | Mullen | .................. | G06Q 10/06 709/223 |
| 7,496,954 B1* | 2/2009 | Himawan | ............... | G06F 21/41 726/8 |
| 7,747,738 B2* | 6/2010 | Ellisor, Jr. | ........ | G06Q 10/06375 705/28 |
| 8,332,917 B2* | 12/2012 | Forster | .................... | G06F 21/41 726/3 |
| 2003/0154403 A1* | 8/2003 | Keinsley | ................. | G06F 21/41 726/8 |
| 2004/0019799 A1* | 1/2004 | Vering | ................ | G06F 21/6218 726/1 |
| 2005/0108396 A1* | 5/2005 | Bittner | ................... | G06Q 10/06 709/225 |
| 2007/0168874 A1* | 7/2007 | Kloeffer | ................. | G06Q 10/06 715/764 |
| 2008/0034412 A1* | 2/2008 | Wahl | ....................... | G06F 21/41 726/8 |
| 2009/0025063 A1* | 1/2009 | Thomas | .............. | G06F 21/6218 726/4 |

(Continued)

OTHER PUBLICATIONS

Roeckle, Haio, Gerhard Schimpf, and Rupert Weidinger. "Process-oriented approach for role-finding to implement role-based security administration in a large industrial organization." Proceedings of the fifth ACM workshop on Role-based access control. ACM, 2000. (pp. 103-110).*

(Continued)

*Primary Examiner* — Kari Schmidt
(74) *Attorney, Agent, or Firm* — Michael A. Springs; Moore & Van Allen PLLC; Peter B. Stewart (57) ABSTRACT

The tool to provide a role-based access tool is configured to receive a single sign-on login from a user; determine an identity of the user based on the single sign-on login; authorize a defined role of the user by: accessing a database comprising a plurality of users and associated roles; and determining the defined role based on the user's identity and the associated roles in the database; present one or more service catalogs to the user based on the defined role of the user; receive a request to complete an action associated with the one or more service catalogs; process the action for execution after receiving the request; and run the action on one or more systems.

11 Claims, 3 Drawing Sheets

(56) References Cited

U.S. PATENT DOCUMENTS

| | | | | |
|---|---|---|---|---|
| 2009/0199277 | A1* | 8/2009 | Norman | H04L 63/105 726/5 |
| 2012/0291090 | A1* | 11/2012 | Srinivasan | G06F 21/6236 726/1 |
| 2015/0089620 | A1* | 3/2015 | Manza | H04L 63/0838 726/8 |
| 2015/0135296 | A1* | 5/2015 | Cason | H04L 63/0815 726/8 |

OTHER PUBLICATIONS

Piger, Stefan, et al. "A comprehensive approach to self-restricted delegation of rights in grids." Cluster Computing and the Grid, 2008. CCGRID'08. 8th IEEE International Symposium on. IEEE, 2008. (pp. 114-121).*

* cited by examiner

ROLE-BASED ACCESS TOOL

FIELD

The present disclosure relates to the field of systems that are used to provide centralized role-based access to multiple systems from a single interface.

BACKGROUND

Technology support is often tasked with completing repetitive tasks that are easy to implement singly but time-consuming to implement across more than one server. For example, backing up one system may be a standard maintenance routine, but backing up more than twenty servers may be time consuming an inefficient for users such as engineers.

Different users often are permitted to perform different types of actions on servers as well. For example, a database administrator may be permitted to perform certain tasks on databases while middleware engineers are permitted to perform different tasks on different parts of the network.

Currently, there is no system that permits prompt and efficient use of resources by providing a customizable interface for executes actions or tasks on multiple servers based on the user's role.

Thus, there is a need for a system to provide a role-based access tool.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

Generally, systems, computer program products, and methods are described herein for an application and system that provides a role-based access tool for executing actions on one or more servers. The role-based access tool increases efficiency and reduces user time spent on repetitive tasks.

In various aspects, the system, computer program product, and computer implemented method are configured to: receive a single sign-on login from a user; determine an identity of the user based on the single sign-on login; authorize a defined role of the user by: accessing a database comprising a plurality of users and associated roles; and determining the defined role based on the user's identity and the associated roles in the database; present one or more service catalogs to the user based on the defined role of the user; receive a request to complete an action associated with the one or more service catalogs; process the action for execution after receiving the request; and run the action on one or more systems.

In an embodiment, the system, computer program product, and computer-implemented method are further configured to identify system parameters associated with the action; evaluate the system on which the action will be run on to determine whether the systems meet the system parameters; and validate the action based on the evaluation.

In an embodiment, the system, computer program product, and computer-implemented method are further configured to generate a report on operating status of the one or more systems on which the action is run.

In an embodiment, the system, computer program product, and computer-implemented method are further configured to store the action in a database; and present the action to the user in the service catalog when the user signs into the system at a later time.

In some embodiments, the one or more service catalogs are transformed based on the identity of the user, the transformation modifying the actions displayed in the service catalog based on actions the user is permitted to execute.

In an embodiment, the system, computer program product, and computer-implemented method are further configured to authorize a defined role of the user by: determining a level of the user in an organization; and determining one or more permitted actions for the user based on the identity of the user and the level of the user, wherein the level is selected from the group consisting of a system administrator, a middleware administrator, a midrange administrator, a database administrator, and an application support specialist.

In some embodiments, the defined role comprises one or more permitted actions for the user based on the defined role.

To the accomplishment the foregoing and the related ends, the one or more embodiments comprise the features hereinafter described and particularly pointed out in the claims. The following description and the annexed drawings set forth certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Having thus described embodiments of the invention in general terms, reference will now be made to the accompanying drawings, which are not necessarily drawn to scale, and wherein:

DETAILED DESCRIPTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

Often many of the tasks performed by technology teams are repetitive and time consuming. For example, technology teams may conduct fact finding tasks (e.g., gathering data about servers, applications, and databases), conduct validation to check whether certain parameters are correct, conduct quick fixes (e.g., generic troubleshoots, configuration resets), conduct maintenance including upgrades and routine clean-ups, and conduct backups and restores of systems. Currently, these tasks take a significant amount of time to complete and due to their repetitive nature the user's time is not being productively used. Further, different users may be permitted to conduct different actions on servers but do not have an efficient and customizable user interface to conduct actions on one or more servers. A system for providing a role-based access tool is therefore advantageous to ensure prompt delivery and efficient use of resources while reducing service time.

In an embodiment, the system transforms data in a graphical user interface based on input received from a user. In this manner, the transformed data is presented to the user and is both responsive to the use's identity and the tasks associated with the user's role. The transformation creates formatted data that is presented in the graphical user interface.

Figure 1:
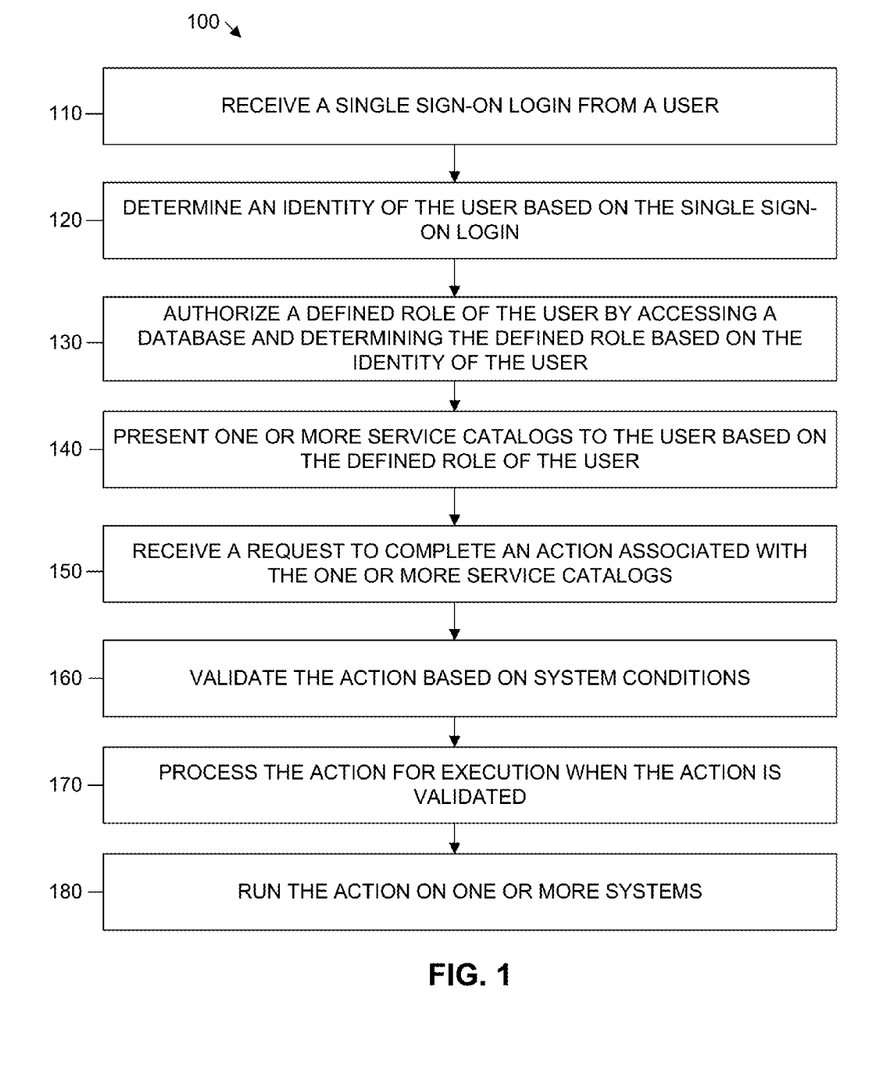
FIG. 1 illustrates a process for providing roles based access to execute actions on one or more systems from a single interface, in accordance with an embodiment of the invention.

In FIG. 1, a method 100 for providing a role-based access tool is illustrated. In some embodiments, the computer-implemented method is configured to receive a single sign-on login from a user; determine an identity of the user based on the single sign-on login; authorize a defined role of the user by: accessing a database comprising a plurality of users and associated roles; and determining the defined role based on the user's identity and the associated roles in the database; present one or more service catalogs to the user based on the defined role of the user; receive a request to complete an action associated with the one or more service catalogs; process the action for execution after receiving the request; and run the action on one or more system.

In block 110, in some embodiments the method receives a single sign-on login from a user. As used herein, the user is an individual logging into the system in order to perform an action via the role-based access tool. In an embodiment, the user is affiliated with an institution, such as a financial institution. For example, the user may be a system administrator, a middleware administrator, a midrange administrator, a database administrator, an application developer, or the like. In some embodiments, the user desires to execute an action on one or more computer systems and uses the role-based access tool to initiate the action.

In an embodiment, a single sign-on login from a user is a process by which a user logs in to a system at a single point and gains access to multiple and/or all systems without bring prompted to log in to each of the multiple systems separately. In some embodiments, the single sign comprises a username and password. In some embodiments, biometric security is used in the single sign-on process, such as fingerprint identification or the like.

In some embodiments, the single sign-on login occurs via a graphical user interface. For example, a website or application on a user device may display a block for entering a username and password. The user navigates to the website or opens the application and inputs the username and password. The layout of the graphical user interface may vary by workstation. For example, a single sign-on login may have a first layout when being accessed via a website and have a second layout when being accessed via an application on a mobile device.

In block 120, in some embodiments the method determines an identity of the user based on the single sign-on login. In an embodiment, the identity of the user may include a variety of information, such as the user's name, the user's title, the user's location, the user's hierarchical level in the business (e.g., manager, supervisor, associate), and the like. In some embodiments, the identity of the user includes a corresponding alphanumeric number (e.g., an employee number) that is used to identify the user to various systems.

In an exemplary embodiment, the system identifies the user by comparing the username and password, or biometric authentication data, to a database comprising records of usernames, passwords, biometric information, and identities. For example, the system may compare the username and password to usernames and associated passwords in the database and if they match then the system determines the associated identity in the database.

In block 130, in some embodiments the method authorizes a defined role of the user by accessing a database and determining the defined role based on the identity of the user. As used herein, a defined role is a collection of tasks and/or actions that may be performed by the user. For example, a system administrator may have a set of actions that the system administrator is permitted to initiate as a result of his or her role in the institution. In an embodiment, an action refers to a job that the user is performs on one or more servers associated with the role-based access tool. In some embodiments, an action refers to analysis of the jobs and/or servers associated with the role-based access tool. For example, a system administrator may be permitted to conduct actions on various servers as well as generate reports relating to the jobs and/or status of the one or more servers.

In some embodiments, the defined role off the user includes user-defined actions. For example, the defined role may include actions that are recorded or input by the user. In some embodiments, the database is updated with these user-defined actions after the user logs in and inputs the action. In an embodiment, the user-defined action is evaluated to determine if it is within the scope of the permitted actions by the user based on the user's identity. For example, the user-defined action may be an aggregation of actions that the user is permitted to take or the user-defined action may relate to servers for which the user has administrator privileges.

In an embodiment, the system authorizes the defined role of the user by accessing a database and determining the defined role based on the identity of the user. The database may be the same database used to determine the identity of the user or it may be a different database. The database comprises actions that the user may performed based on the identity of the user. For example, a system administrator may be able to perform actions A, B, and C while a database administrator may be able to perform actions C, D, and E. As discussed, a specific database administrator may also input a user-defined action F and therefore this specific database administrator may be able to perform actions C, D, E, and F.

In some embodiments, to authorize means to permit the user to take an action via the role-based access tool. In some embodiments, to authorize means to permit the user to undertake the permitted actions on one or more servers or computing devices associated with the role-based access tool.

In block 140, in some embodiments the method presents one or more service catalogs to the user based on the defined role of the user. A service catalog is a display of actions that the user is authorized to perform. In some embodiments, the service catalog includes at least one of pre-defined actions, custom or user-defined actions, network actions, operating system actions, and configuration management database actions. In some embodiments, the service catalog includes an option to build a custom action.

Figure 3:
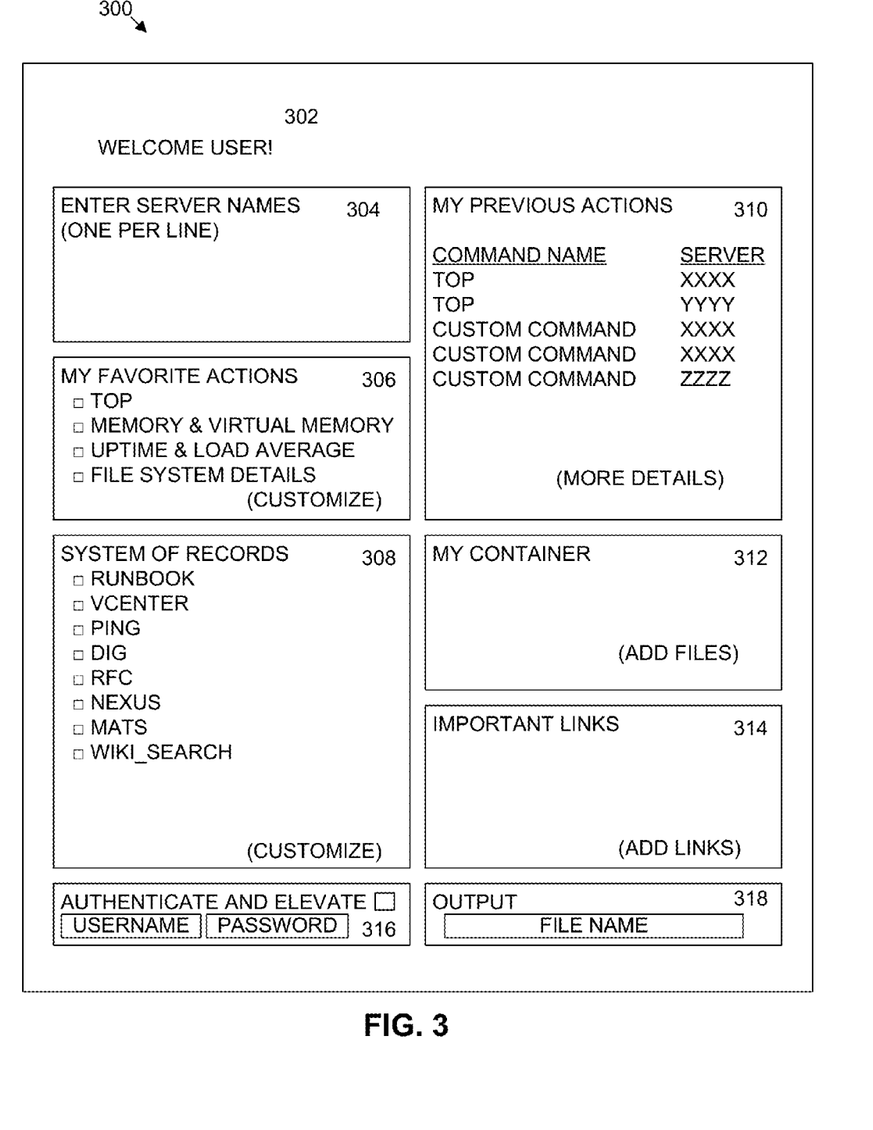
FIG. 3 illustrates an exemplary graphical user interface for implementing the role based access tool, in accordance with embodiments of the invention.

Turning briefly to FIG. 3, an exemplary screenshot 300 of a graphical user interface displaying a service catalog is provided. In this embodiment, the user is acknowledged 302 so that the user knows that he or she has logged in successfully. The user is provided the opportunity to enter server names 304 on which the action will be executed. In some embodiments, a list of favorite actions 306 is provided. The list of favorite actions may be determined by the user via a selection process, via the system based on analysis of frequency of execution of various actions, or via a combination of the two processes. In some embodiments, the graphic user interface includes a system of records 308 that discloses various actions that may be undertaken by the user as part of the service catalog (e.g., runbook, vcenter, ping, dig, rfc, and the like). In an embodiment, the system also tracks the most recent actions 310 performed by the user and presents those actions to in the service catalog. For example, the action and associated server list for the five most recent actions executed by the user may be stored and displayed. Still further, a container section 312 may include links to documents and or applications that the user has flagged as of interest. The container section may be used to provide convenient access to documents and other information that the user wishes to review in the future. Important links 314 may also be included in a section of the interface. In some embodiments, the action can be authenticated and elevated 316 to a higher level of review. In a still further embodiment, the graphical user interface permits the user to output data 318 via the role-based access tool. For example, the user may be able to generate reports relating to the execution of actions and/or to the status of one or more servers or communication between servers. This graphical user interface is fully customizable by the user.

Turning back to FIG. 1, in block 150 in some embodiments the method receives a request to complete an action associated with the one or more service catalogs. An action is performed on one or more servers associated with the role-based access tool. In an embodiment, the action may be performed on up to fifty servers. In some embodiments, the action may be performed on up to ten servers, up to twenty servers, up to thirty servers, up to forty servers, up to fifty servers, or up to one hundred servers. In an embodiment, the server is a Unix server.

As used herein, an action encompasses a wide range of tasks associated with servers. The action may execute on existing automation or scripts and integrate with various configuration management database (CMDB) system, such as Runbook, Maximo, and the like with the CMDBs. In some embodiments, the actions cross-check system and data integrity. In an embodiment, the actions may be classified into two distinct classifications: (1) a constant generic task with large infrastructure; and (2) a customizable user task. In some embodiments, the system reduces the turn-around time for responding to incidents and requests for server assistance because the request may be fulfilled in multiple servers at one time.

In one embodiment, the actions are user level OS commands that may be run on multiple Unix systems from a single interface. In some embodiments, the actions include evaluating whether devices are operative, determining whether the link between the servers is operative, and determining CPU utilization, memory utilization, and/or disk utilization, or the like. Ping status, secure socket shell (ssh) status, and backup status may all be determined on multiple servers via the role-based access tool. In further embodiments, network information such as network interface card details, network speed, or the like may be determined. Uptime details and server support details may also be identified. In some embodiments, the server configuration may be determined, as well as file system space details and port availability. It should be understood that a wide variety of OS actions, network actions, and CMDB actions may be performed on one or more remote servers via the role-based access tool and that the listed actions are merely exemplary.

In an embodiment, the one or more servers on which the action will be executed are also received by the system from the user. In some embodiments, the user selects a variety of servers but in other embodiments the specific servers are selected by the system based on the actions selected by the user. For example, the user may select a specific action (e.g., executing an application on all servers on which the application is installed) and the system determines on which servers the application is installed.

In block 160, in some embodiments the method validates the action based on system conditions. In an embodiment, validation confirms that the action can be performed. For example, validation may conduct pre-checks to ensure that connectivity access is acceptable so that the action can be performed on the selected servers.

In block 170, in some embodiments the method processes the action for execution when the action is validated. The system may gather necessary information in order to execute the action. In some embodiments, the method stores the action in association with the user in a database.

In block 180, in some embodiment the method runs the action on one or more systems. The action may be performed immediately or may be delayed based on a request of the user or policies associated with the system. In an embodiment, the execution of the action is tracked and reported or updated to the user as the action is being executed on the one or more servers.

In a further embodiment, the method prepares a report of the result of the action for the user. In an embodiment, the report provides an output relevant to the action being performed. In some embodiments, the report breaks the performance of the servers down by individual server. In further embodiments, high level information relating to the server is provided, such as length of time running, number of current users, load average, number of tasks active, division of tasks between running and inactive, CPU utilization, memory utilization, and a breakdown of the utilization based on the tasks and associated users running on the server. In an embodiment, the report may be output as a document, database file, or spreadsheet.

It should be understood that the steps disclosed herein are not limiting. Additional steps in the method of providing roles based access to execute actions on one or more system from a single interface may occur. Similarly, the order of the steps disclosed herein is not required. In some embodiments, the order may change based on the needs of the user.

Figure 2:
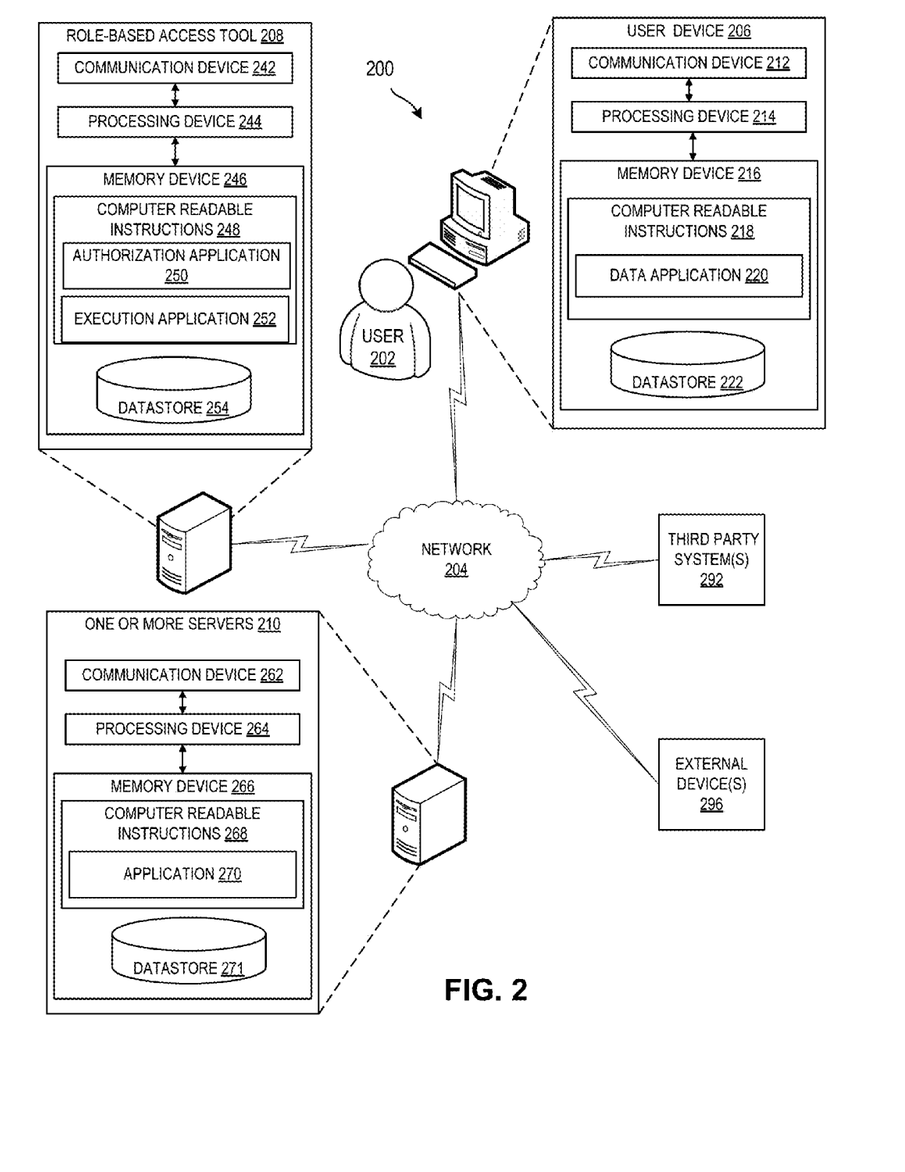
FIG. 2 illustrates a block diagram illustrating an environment including a role based access tool, in accordance with various embodiments.

Turning now to FIG. 2, a block diagram illustrates an environment 200 for providing a role-based access tool. The environment 200 includes a user device 206, the role-based access tool 208, and one or more servers 210. The user 202 is associated with the user device 206 and can include an owner of the device 144, parties that have authorized access to the device 206, an employee, associate, and the like. In exemplary embodiments, the user is selected from the groups consisting of a system administrator, a middleware administrator, a midrange administrator, a database administrator, and representative of a financial institution.

The user device 206 can include any type of device such as a computing device, a mobile device, and so forth. The environment 200 further includes one or more other third party systems 292 (e.g., a partner, agent, or contractor associated with the role-based access tool 208), and one or more external devices 296 (e.g., USB flash drives, hard drives, and other removable media). The systems and devices communicate with one another over the network 204 and perform one or more of the various steps and/or methods according to embodiments of the disclosure discussed herein.

The network 204 may include a local area network (LAN), a wide area network (WAN), and/or a global area network (GAN). The network 204 may provide for wireline, wireless, or a combination of wireline and wireless communication between devices in the network. In one embodiment, the network 204 includes the Internet.

The user device 206, the role-based access tool 208, and the one or more servers 210 each include a computer system, server, multiple computer systems and/or servers or the like. The role-based access tool 208, in the embodiments shown has a communication device 242 communicably coupled with a processing device 244, which is also communicably coupled with a memory device 246. The processing device 244 is configured to control the communication device 242 such that the role-based access tool 208 communicates across the network 204 with one or more other systems. The processing device 244 is also configured to access the memory device 246 in order to read the computer readable instructions 248, which in some embodiments includes authorization applications 250 and execution applications 252. The authorization application 250 may be configured to determine an identity of the user and authorize the user for one or more tasks by comparing the identity of the user to a database. The execution application 252 may validate the requested task and run the task on the one or more servers 210. The memory device 246 also includes a datastore 254 or database for storing pieces of data that can be accessed by the processing device 244, such as data on users (e.g., permitted actions, user-defined actions, history of actions).

As used herein, a "processing device," generally refers to a device or combination of devices having circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device 214, 244, or 264 may further include functionality to operate one or more software programs based on computer-executable program code thereof, which may be stored in a memory. As the phrase is used herein, a processing device 214, 244, or 264 may be "configured to" perform a certain function in a variety of ways, including, for example, by having one or more general-purpose circuits perform the function by executing particular computer-executable program code embodied in computer-readable medium, and/or by having one or more application-specific circuits perform the function.

As used herein, a "memory device" generally refers to a device or combination of devices that store one or more forms of computer-readable media and/or computer-executable program code/instructions. Computer-readable media is defined in greater detail below. For example, in one embodiment, the memory device 246 includes any computer memory that provides an actual or virtual space to temporarily or permanently store data and/or commands provided to the processing device 244 when it carries out its functions described herein.

The user device 206 includes a communication device 212 communicably coupled with a processing device 214, which is also communicably coupled with a memory device 216. The processing device 214 is configured to control the communication device 212 such that the target device 144 communicates across the network 204 with one or more other systems. The processing device 214 is also configured to access the memory device 216 in order to read the computer readable instructions 218, which in some embodiments includes a data application 220 for running specific programs and developing requests for information. The memory device 216 also includes a datastore 222 or database for storing pieces of data that can be accessed by the processing device 214.

The one or more servers 210 includes a communication device 262 communicably coupled with a processing device 264, which is also communicably coupled with a memory device 266. The processing device 264 is configured to control the communication device 262 such that the third party system 210 communicates across the network 204 with one or more other systems. The processing device 264 is also configured to access the memory device 266 in order to read the computer readable instructions 268, which in some embodiments include applications 270 for performing various tasks associated with the server, and so forth. The memory device 266 also includes a datastore 271 or database for storing pieces of data that can be accessed by the processing device 264.

The applications 220, 250, 252, and 270 are for instructing the processing devices 214, 244 and 264 to perform various steps of the methods discussed herein, and/or other steps and/or similar steps. In various embodiments, one or more of the applications 220, 250, 252, and 270 are included in the computer readable instructions stored in a memory device of one or more systems or devices other than the systems 208 and 210 and the user device 206. For example, in some embodiments, the application 220 is stored and configured for being accessed by a processing device of one or more third party systems 292 connected to the network 204. In various embodiments, the applications 220, 250, 252, and 270 stored and executed by different systems/devices are different. In some embodiments, the applications 220, 250, 252, and 270 stored and executed by different systems may be similar and may be configured to communicate with one another, and in some embodiments, the applications 220, 250, 252, and 270 may be considered to be working together as a singular application despite being stored and executed on different systems.

In various embodiments, one of the systems discussed above, such as the role-based access tool 208, is more than one system and the various components of the system are not collocated, and in various embodiments, there are multiple components performing the functions indicated herein as a single device. For example, in one embodiment, multiple processing devices perform the functions of the processing device 244 of the role-based access tool 208 described herein. In various embodiments, the role-based access tool 208 includes one or more of the external systems 296 and/or any other system or component used in conjunction with or to perform any of the method steps discussed herein. For example, the role-based access tool 208 may include a financial institution system, an information technology system, and the like.

In various embodiments, the role-based access tool 208, the one or more servers 210, and the user device 206 and/or other systems may perform all or part of a one or more method steps discussed above and/or other method steps in association with the method steps discussed herein. Furthermore, some or all the systems/devices discussed here, in association with other systems or without association with other systems, in association with steps being performed manually or without steps being performed manually, may perform one or more of the steps of method 100, or other methods, processes or steps discussed herein or not discussed herein.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as Java, Pearl, Smalltalk, C++ or the like. However, the computer program code/computer-readable instructions for carrying out operations of the invention may also be written in conventional procedural programming languages, such as the "C" programming language or similar programming languages.

Embodiments of the present invention described above, with reference to flowchart illustrations and/or block diagrams of methods or apparatuses (the term "apparatus" including systems and computer program products), will be understood to include that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

Specific embodiments of the invention are described herein. Many modifications and other embodiments of the invention set forth herein will come to mind to one skilled in the art to which the invention pertains, having the benefit of the teachings presented in the foregoing descriptions and the associated drawings. Therefore, it is to be understood that the invention is not to be limited to the specific embodiments disclosed and that modifications and other embodiments and combinations of embodiments are intended to be included within the scope of the appended claims. Although specific terms are employed herein, they are used in a generic and descriptive sense only and not for purposes of limitation.

What is claimed is:

1. A system for providing a role-based access tool, the system comprising:
   a memory device having computer readable program code store thereon; and
   a processing device coupled to the memory device, wherein the processing device executes the computer readable program code to:
   receive a single sign-on login from a user;
   determine an identity of the user based on the single sign-on login;
   authorize a defined role of the user by:
     accessing a database comprising a plurality of users and associated roles; and
     determining a level of the user in an organization;
     determining the defined role based on the identity of the user and the associated roles in the database and the level of the user;
     wherein the level is selected from the group consisting of a system administrator, a middleware administrator, a midrange administrator, a database administrator, and an application support specialist;
   present one or more service catalogs to the user based on the defined role of the user, wherein the one or more service catalogs comprise a listing of actions that the user is authorized to perform;
   receive a request to complete an action associated with the listing of actions from the one or more service catalogs, wherein the request comprises a plurality of systems on which to complete the action;
process the action for execution after receiving the request by:
identifying system parameters associated with the action;
evaluating each of the plurality of systems on which the action will be run to determine whether each of the plurality of systems meet the system parameters;
determining that each of the plurality of systems meet the system parameters; and
validating the action based on determining that each of the plurality of systems meet the system parameters; and
run the action on each of the plurality of systems, wherein the user does not provide an additional sign-in login for each of the plurality of systems.

2. The system of claim 1, wherein the processing device further executes the computer readable program code to: generate a report on operating status of each of the plurality of systems on which the action is run.

3. The system of claim 1, wherein the one or more service catalogs are transformed based on the identity of the user, the transformation modifying the actions displayed in the service catalog based on actions the user is permitted to execute.

4. The system of claim 1, wherein the defined role comprises one or more permitted actions for the user based on the defined role.

5. A computer program product for providing a role-based access tool, the computer program product comprising at least one non-transitory computer-readable medium having computer-readable program code portions embodied therein, the computer-readable program code portions comprising:
an executable portion configured to receive a single sign-on login from a user;
an executable portion configured to determine an identity of the user based on the single sign-on login;
an executable portion configured to authorize a defined role of the user by:
accessing a database comprising a plurality of users and associated roles; and
determining a level of the user in an organization;
determining the defined role based on the identity of the user and the associated roles in the database and the level of the user;
wherein the level is selected from the group consisting of a system administrator, a middleware administrator, a midrange administrator, a database administrator, and an application support specialist;
an executable portion configured to present one or more service catalogs to the user based on the defined role of the user, wherein the one or more service catalogs comprise a listing of actions that the user is authorized to perform;
an executable portion configured to receive a request to complete an action associated with the listing of actions from the one or more service catalogs, wherein the request comprises a plurality of systems on which to complete the action;
an executable portion configured to process the action for execution after receiving the request by:
identifying system parameters associated with the action;
evaluating each of the plurality of systems on which the action will be run to determine whether each of the plurality of systems meet the system parameters;
determining that each of the plurality of systems meet the system parameters; and
validating the action based on determining that each of the plurality of systems meet the system parameters; and
an executable portion configured to run the action on each of the plurality of systems, wherein the user does not provide an additional sign-in login for each of the plurality of systems.

6. The computer program product of claim 5, wherein the computer-readable program code portions further comprise:
an executable portion configured to generate a report on operating status of each the plurality of systems on which the action is run.

7. The computer program product of claim 5, wherein the one or more service catalogs are transformed based on the identity of the user, the transformation modifying the actions displayed in the service catalog based on actions the user is permitted to execute.

8. The computer program product of claim 5, wherein the defined role comprises one or more permitted actions for the user based on the defined role.

9. A method for providing a role-based access tool, the method comprising:
receiving, via a computing device processor, a single sign-on login from a user;
determining, via the computing device processor, an identity of the user based on the single sign-on login;
authorizing, via the computing device processor, a defined role of the user by:
accessing a database comprising a plurality of users and associated roles; and
determining a level of the user in an organization;
determining the defined role based on the identity of the user and the associated roles in the database and the level the user;
wherein the level is selected from the group consisting of a system administrator, a middleware administrator, a midrange administrator, a database administrator, and an application support specialist;
presenting, via the computing device processor, one or more service catalogs to the user based on the defined role of the user, wherein the one or more service catalogs comprise a listing of actions that the user is authorized to perform;
receiving, via the computing device processor, a request to complete an action associated with the listing of actions from the one or more service catalogs, wherein the request comprises a plurality of systems on which to complete the action;
processing, via the computing device processor, the action for execution after receiving the request by:
identifying system parameters associated with the action;
evaluating each of the plurality of systems on which the action will be run to determine whether each of the plurality of systems meet the system parameters;
determining that each of the plurality of systems meet the system parameters; and
validating the action based on determining that each of the plurality of systems meet the system parameters; and
running, via the computing device processor, the action on each of the plurality of systems, wherein the user does not provide an additional sign-in login for each of the plurality of systems.

10. The method of 9, wherein the method further comprises generating a report on operating status of each of the plurality of systems on which the action is run.

11. The method of 9, wherein the one or more service catalogs are transformed based on the identity of the user, the transformation modifying the actions displayed in the service catalog based on actions the user is permitted to execute.

* * * * *